United States Patent [19]

Lee

[11] Patent Number: 5,009,866
[45] Date of Patent: Apr. 23, 1991

[54] FUSED SALT PROCESS FOR PURIFYING ZIRCONIUM AND/OR HAFNIUM TETRACHLORIDES

[75] Inventor: Ernest D. Lee, Ogden, Utah

[73] Assignee: Westinghouse Electric Corp., Pittsburgh, Pa.

[21] Appl. No.: 437,152

[22] Filed: Nov. 16, 1989

[51] Int. Cl.⁵ .................... C01G 25/04; C01G 27/04
[52] U.S. Cl. ........................ 423/73; 423/76; 423/84; 423/492
[58] Field of Search .............. 423/492, 73, 75, 76, 423/84, 77; 23/294 R

[56] References Cited

U.S. PATENT DOCUMENTS

| | | | |
|---|---|---|---|
| 2,618,531 | 11/1952 | Lindblad et al. | 423/77 |
| 2,744,060 | 5/1956 | Eaton | 423/73 |
| 2,962,352 | 11/1960 | Schott et al. | 23/294 R |
| 3,098,722 | 7/1963 | Carlson et al. | 23/294 R |
| 3,966,458 | 6/1976 | Spink | 423/75 |
| 4,021,531 | 5/1977 | Besson et al. | 423/492 |
| 4,897,116 | 1/1990 | Scheel | 423/76 |

Primary Examiner—Michael L. Lewis
Assistant Examiner—Brian M. Bolam
Attorney, Agent, or Firm—J. C. Valentine

[57] ABSTRACT

Continuous production of zirconium and/or hafnium metal from a fused salt bath in which one of the salts is zirconium and/or hafnium tetrachloride is carried out by feeding additional, make-up zirconium and/or hafnium tetrachloride powder into a zirconium and/or hafnium dissolution area of the bath maintained at a dissolution temperature below which the tetrachloride will vaporize, by circulating portions of the bath into and through a separate but contiguous area maintained at a temperature at which the tetrachloride will vaporize, and by recovering the vaporized tetrachloride. It is preferred that the vaporization area of the bath be wholly surrounded by and insulated from the dissolution area of the bath.

10 Claims, 1 Drawing Sheet

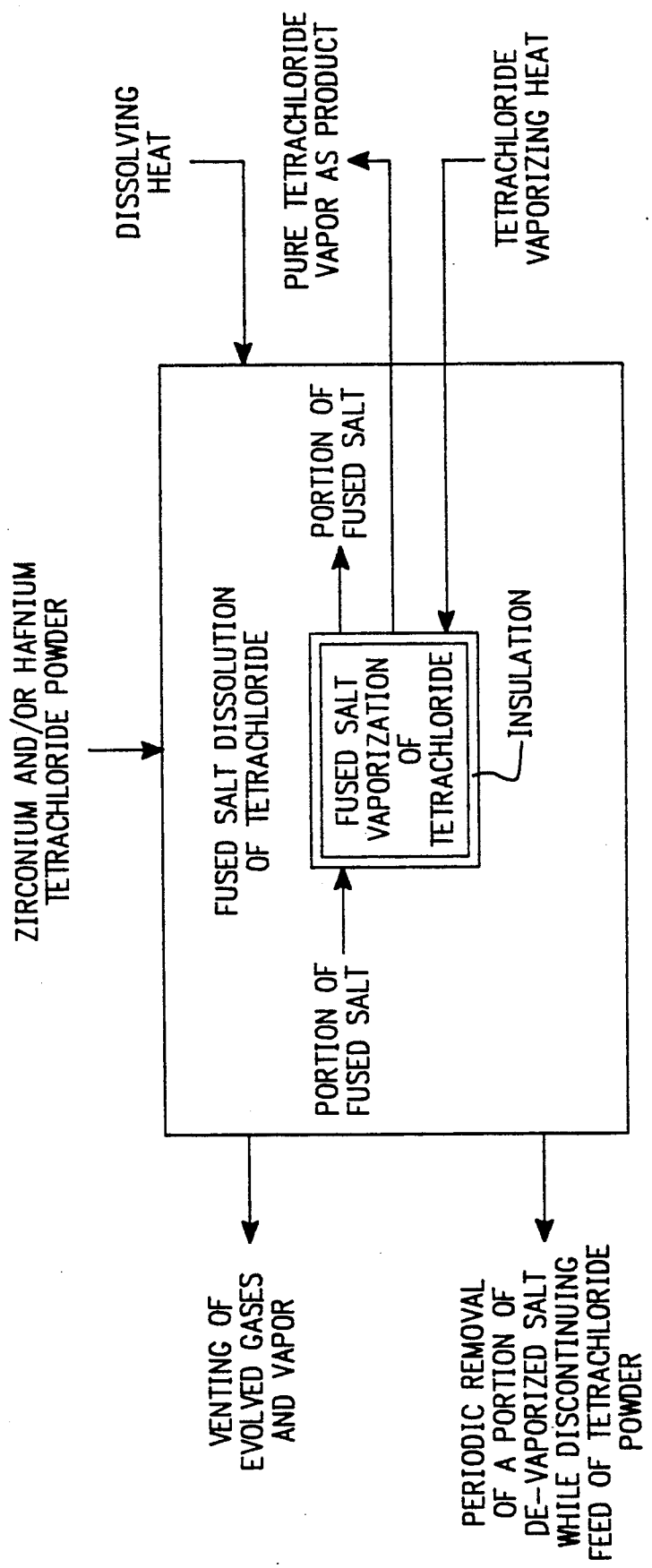

FUSED SALT PROCESS FOR PURIFYING ZIRCONIUM AND/OR HAFNIUM TETRACHLORIDES

BACKGROUND OF THE INVENTION

1. Field of the Invention

The invention has to do with the production on a continuous basis of highly pure zirconium and/or hafnium vapors for use in the further production of zirconium or hafnium metal.

2. Description of the Prior Art

In the production of zirconium or hafnium metal, as used structurally in the nuclear industry, from a source material such as zircon sand, it has been common practice to employ a purification process involving the controlled sublimation of a solid tetrachloride of zirconium or hafnium or both. In that process, trace impurities such as carbon and other chlorides, e.g. those of iron, uranium, phosphorous, and aluminum, are largely eliminated by separating tetrachlorides of zirconium and/or hafnium from oxides and oxychlorides of zirconium and/or hafnium. This is normally accomplished in a fluidized bed or flash type of subliming vessel, which is externally heated and into which the solid tetrachloride as a powder is continuously charged by means of an auger or pneumatic transporting device. As the tetrachloride powder reaches its subliming temperature, the vapor therefrom leaves the vessel through a filter located at the top of the vessel. Impurities such as those mentioned above, having a lower vapor pressure at the operating temperature, are partially left behind in the subliming vessel.

This process suffers from the fact that the equipment employed is difficult to operate. It is difficult to feed the tetrachloride powder into the vessel, because the tetrachloride vapor condenses on the feeder and plugs the operation and the subliming vessel has poor heat transfer characteristics requiring large surface areas to process small quantities of the tetrachloride; also, the impurity separation is not complete, because impurities vaporize at the operating temperature.

A fused salt system for producing a zirconium/hafnium vapor by sublimation of a zirconium/hafnium tetrachloride powder is described in U.S. Pat. No. 3,098,722 of July 23, 1963, which employs a melting vessel and a separate vaporizing vessel. U.S. Pat. No. 4,021,531 of May 3, 1977, discloses that combined zirconium/hafnium tetrachloride vapors from a sublimation unit may be fed to an extractive distillation procedure for the separation of hafnium from the zirconium. A fused salt system does have advantages in that it produces a tetrachloride vapor of greater purity than is obtained by the commonly used process described above and the vapor is free of nitrogen and oxygen, which is highly desirable. This is a result of the complexing of the impurities with the fused salt, making them much less volatile.

DESCRIPTION OF THE INVENTION

A principal objective in the making of the present invention was to provide a superior fused salt process that can be operated continuously in apparatus that is relatively simple in construction, and that produces tetrachloride vapor so pure that it can be reduced to metal directly by electrolysis or by magnesium reduction.

In contrast to the system of the afore-noted U.S. Pat. No. 3,098,722, which requires two vessels and a pumping system to transfer fused salts from one of the vessels to the other one, the system of the invention utilizes a single vessel that is double chambered, one chamber being contiguous to the other. The vessel is externally heated and preferably contains a thermally insulated, tetrachloride volatilizing chamber that is heated independently as a secondary chamber and is surrounded by a primary salt-fusing, tetrachloride dissolving chamber defined externally by the walls of the vessel. Fused salts in the primary chamber are heated to at or preferably just below the sublimation temperature of the tetrachloride being processed, make-up additions to the tetrachloride content being fed to the molten bath in the primary chamber as a powder and mixed into the fused salts. As the added tetrachloride dissolves, degassing of entrained nitrogen, oxygen, and water vapor takes place. These released gases and vapors are conducted out of the vessel. Oxides and oxychlorides in the tetrachloride remain suspended in the fused salts as solids.

There is circulating flow of the fused salts between the two chambers. A portion of the fused salts in the primary chamber passes into the secondary chamber, which is maintained at a higher temperature than is the primary chamber. Flow into the secondary chamber is either by reason of the temperature gradient alone or as aided by an impeller. Within the secondary chamber, the higher temperature breaks the complexing bond between the tetrachloride in the molten, fused salts bath, whereupon the tetrachloride is volatilized. Trace metal impurities are highly complexed with the fused salt and remain there. Fused salts in the secondary chamber flow back into the primary chamber, where they are cooled by incoming tetrachloride feed.

The concentration of impurities in the molten, fused salts bath must be maintained below a given maximum. This is accomplished by periodically discontinuing tetrachloride feed to the primary chamber, stripping most of the tetrachloride content from the molten bath in the secondary chamber, removing a portion of the stripped molten bath from the vessel, and replacing it with fresh salt or salts.

There are several salt systems that can be used, all having certain characteristics. Thus:

(1) The salt must be molten at or below the sublimation temperature of the zirconium or the hafnium or the zirconium/hafnium tetrachloride.

(2) The salt must act as a solvent for the tetrachloride concerned, without chemically altering it.

(3) The vapor pressure of the tetrachloride powder over the fused salt mixture must be significantly low at the dissolving temperature to not interfere with dissolution of the powder in the fused salt.

(4) Metal chloride impurities must be complexed with the salt to a greater extent than the tetrachloride, so that they are less volatile than the tetrachloride.

(5) It must be possible to strip a significant portion of the solubilized tetrachloride from the salt by raising the temperature of the salt without accompanying solidification of the salt.

The following salt systems are a few of those that more or less satisfy these requirements:

(1) NaCl, KCl, and $ZrCl_4$ ($HfCl_4$) with approximate molar ratios of 8%, 29%, and 63%, or the same salts with molar ratios of 17%, 17%, and 65%;

(2) NaCl and $ZrCl_4$ with molar ratio of 35% and 65%, respectively;

(3) KCl and ZrCl₄ (HfCl₄) with molar ratios of 36% and 64%, respectively;

(4) AlCl₃ and KCl with approximate molar ratios of 49% and 51%, rspectively;

(5) AlCl₃ and NaCl;

(6) FeCl₃ and KCl;

(7) FeCl₃ and NaCl.

THE DRAWING

The best mode presently contemplated for carrying out the invention in actual practice is illustrated in the accompanying drawing, in which the single FIGURE is a block diagram illustrative of the process of the invention and indicative of preferred apparatus for carrying out the process.

DETAILED DESCRIPTION OF THE ILLUSTRATED EMBODIMENT

As shown by the accompanying drawing, the process of the invention comprises the steps of heating and maintaining a body of suitable salts, that include zirconium and/or hafnium tetrachloride, to salt-fusing temperature at or just below the temperature of volatilization of the zirconium and/or hafnium tetrachloride. Additional tetrachloride is fed as a powder into such body of salt for dissolution therein.

Such body of fused salt, into which the tetrachloride powder has been dissolved, is continuously circulated through a separate but contiguous area that is heated to a higher temperature at which the tetrachloride is vaporized. The tetrachloride vapor is substantially free of impurities and is continuously conducted to a location of recovery as the desired product of the process.

Gases and vapors, such as water, oxygen, and nitrogen, that are given off during the dissolution of the tetrachloride powder, are vented to the atmosphere or passed to suitable treatment, while a portion of the fused salt that has circulated and had tetrachloride vaporized therefrom is periodically removed during a limited time period in which feeding of the powdered tetrachloride is halted. The fused salt retains solid impurities, such as carbon and oxides and oxychlorides of zirconium and hafnium. The portions removed are discarded and fresh salt introduced as make-up. It is preferred to thermally insulate the vaporization area and to surround it with the body of salt to be fused.

The process is preferably carried out in apparatus comprising a simple, double-chambered, closed vessel, which may be made of carbon steel. The vessel has a vaporization chamber within and surrounded by a dissolution chamber. It is thermally insulated from the dissolution chamber and constructed to contain fused salts at a pressure as high as ten pounds per square inch.

Each chamber is heated independently of the other by appropriate heating means. A vent is provided in the dissolution chamber for releasing gases and vapors evolved therein, and an offtake pipe is provided in the volatilization chamber for conducting volatile tetrachloride therefrom to a recovery location. Ducts are provided for circulation of the molten bath from the dissolution chamber into the vaporization chamber and vice versa, the inlet to the vaporization chamber preferably being located at the bottom of the chamber. An impeller is provided at a suitable location to facilitate mixing of the introduced tetrachloride powder with the fused salts to aid circulation of fused salt between chambers. Various ports may be provided for measuring salt temperature, chamber pressure, and for sampling purposes.

Simulated examples are as follows:

EXAMPLE 1

The dissolution chamber of the preferred apparatus described above is filled with a molten salt having molar composition approximately 8% NaCl, 29% KCl and 63% ZrCl₄. The temperature is maintained approximately within the range of 230° and 350° C., preferably between 250° and 300° C. Zirconium tetrachloride powder is fed into the dissolution chamber and dissolves in the molten salts. Gas and vapor introduced with the tetrachloride powder is vented from the dissolution chamber. Molten salts, enriched by the added zirconium tetrachloride, flow into the vaporization chamber, which is maintained at a volatilization temperature between 340° and 450° C., preferably between 360° and 420° C. Zirconium tetrachloride boils out of the molten salts as a vapor and discharges from the vaporization chamber to a reduction vessel where the tetrachloride is converted to zirconium metal. Circulation of the fused salts through the two chambers of the processing vessel is quite slow and the fused salts returning to the dissolution chamber are cooled by the zirconium chloride powder introduced into the processing vessel. Fused salts are periodically tapped from the vessel and replaced by fresh NaCl. The zirconium content of the tapped salt is recovered by placing such tapped salt in a NaCl—FeCl₃ salt bath. Raising the temperature of the NaCl—FeCl₃ fused salt results in the stripping of the zirconium tetrachloride content of the molten salt bath for further recovery.

EXAMPLE 2

This example is carried out in the same apparatus using a molten salt having the approximate molar composition of 37% NaCl and 63% ZrCl₄. The temperature is maintained at approximately 315° to 350° C., preferably between 320° and 330° C. Zirconium tetrachloride powder is fed into the dissolution chamber and dissolves in the molten salts. Gas and vapor introduced with the tetrachloride powder is vented from the dissolution chamber. Molten salts, enriched by the zirconium tetrachloride, flow into the vaporization chamber, which is maintained at a volatilization temperature between 380° and 450° C., but preferably between 400° and 420° C. Zirconium tetrachloride boils out of the molten salt bath as a vapor and discharges from the vaporization chamber to a recovery location for subsequent use in the production of zirconium metal, preferably by direct reduction of the recovered zirconium tetrachloride vapor by electrowinning in a molten salt. Circulation of the fused salts through the two chambers of the processing vessel is quite slow and the fused salts entering the dissolution chamber from the vaporization chamber are cooled by the zirconium chloride powder introduced into the processing vessel. Fused salts are periodically tapped from the vessel and replaced by fresh NaCl. The zirconium content of the tapped salt is recovered by placing such tapped salt in an NaCl—FeCl₃ salt bath. Raising the temperature of the NaCl—FeCl₃ fused salts in the salt bath results in the stripping of zirconium tetrachloride with a small amount of ferric chloride in the zirconium tetrachloride vapor stream. This impure vapor can be returned to the dissolving chamber.

EXAMPLE 3

This example is also carried out in the same apparatus using a molten binary salt having an approximate molar composition of 43% $FeCl_3$ and 57% KCl. The salt in the dissolution chamber is maintained at a temperature of from 180° to 310° C. and preferably 240° to 280° C. Hafnium tetrachloride powder is introduced into the dissolution chamber and mixes with the fused salts therein. The so-enriched fused salt bath circulates into and through the vaporization chamber, which is maintained at a temperature of between 375° and 460° C. and preferably between 410° and 430° C. Hafnium tetrachloride boils out of the fused salt bath in the vaporization chamber as a vapor containing up to 3% $FeCl_3$. The vapor is discharged from the vaporization chamber and passed through a scrubber to remove the ferric chloride before being conducted to a recovery location. Periodically the concentration of metal impurities and solid oxides in the fused salt bath is lowered by halting the introduction of the hafnium tetrachloride powder, by stripping substantially all of the hafnium tetrachloride from the fused salt by continued vaporization, and by then tapping from the vessel an effective quantity of the fused salt and replacing it with fresh salt. This procedure does not require the additional step of Example 1 for recovery of hafnium tetrachloride values in the tapped salt.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim as my invention:

1. A fused salt process for continuously purifying zirconium and/or hafnium tetrachloride dissolved in a molten bath in a vessel, comprising the steps of:
   maintaining a mass of a suitable mixture of salts, including zirconium and/or hafnium tetrachloride;
   heating said mixture of salts to a temperature at or immediately below the vaporization temperature of the zirconium and/or hafnium tetrachloride at which temperature said mixture of salts is fused to form a molten, tetrachloride-dissolving bath;
   continuously introducing into said dissolving bath a zirconium and/or hafnium tetrachloride powder;
   heating a portion of said dissolving bath in situ to a temperature higher than the vaporization temperature of the zirconium and/or hafnium tetrachloride so as to vaporize the tetrachloride;
   internally circulating said dissolving bath whereby the portion of said dissolving bath at the higher temperature circulates with the bath at the lower temperature;
   venting gases and vapors evolved from said dissolving bath at the lower temperature; and
   recovering the tetrachloride vapors vaporized at the higher temperature separately from the gases and the vapors evolved at the lower temperature.

2. A fused salt process for continuously purifying zirconium and/or hafnium, comprising the steps of:
   maintaining a mass of a suitable mixture of salts, including zirconium and/or hafnium tetrachloride, in a vessel;
   heating said mixture of salts to a temperature at or immediately below the vaporization temperature of the zirconium and/or hafnium tetrachloride at which temperature said mixture of salts is fused to form a molten, tetrachloride-dissolving bath;
   continuously introducing into said dissolving bath a zirconium and/or hafnium tetrachloride powder;
   heating a portion of said dissolving bath in the vessel in situ to a temperature higher than the vaporization temperature of the zirconium and/or hafnium tetrachloride so as to vaporize the tetrachloride;
   surrounding the portion of said dissolving bath at the high temperature with said dissolving bath at the low temperature and thermally insulating the high temperature portion from the low temperature portion of said dissolving bath;
   pumplessly circulating said dissolving bath throughout said vessel whereby the portion of said dissolving bath at the higher temperature circulates with the bath at the lower temperature;
   venting gases and vapors evolved from said dissolving bath at the lower temperature; and
   recovering the tetrachloride vapors vaporized at the higher temperature separately from the gases and the vapors evolved at the lower temperature.

3. A fused salt process according to claim 1, wherein the zirconium and/or hafnium tetrachloride powder is introduced into the dissolving bath so as to contact and cool the high temperature portion of said dissolving bath circulating thereinto.

4. A fused salt process according to claim 1, wherein a portion of the dissolving bath is periodically removed therefrom while halting the introduction of the tetrachloride powder; and the said portion is replaced with fresh salt.

5. A fused salt process according to claim 4, wherein the removed portion of the dissolving bath is placed in a bath of salt solution and is heated therein to tetrachloride volatilizing temperature; the volatilized tetrachloride is drawn off from said bath of salt solution; and the drawn-off tetrachloride vapor is returned to said dissolving bath for circulation through the processing system.

6. A fused salt process according to claim 5, wherein the salt is NaCl, and the salt bath is $NaCl$—$FeCl_3$.

7. A fused salt process according to claim 4, wherein the salt is a binary salt composition containing $FeCl_3$ as one of the salts, and the vaporized tetrachloride contains a relatively small percentage of vaporized $FeCl_3$ and is passed through a scrubber to remove the $FeCl_3$.

8. A fused salt process according to claim 7, wherein the binary salt is KCl and $FeCl_3$.

9. A fused salt process according to claim 4, wherein tetrachloride is stripped from the fused salt by continued vaporization thereof during the time introduction of the tetrachloride powder is halted.

10. A fused salt process according to claim 1, wherein the molten tetrachloride-dissolving salt bath has a molar composition approximately 8% NaCl, 29% KCl, and 63% $ZrCl_4$ and/or $HfCl_4$.

* * * * *